US012767181B2

(12) United States Patent
Kim et al.

(10) Patent No.: US 12,767,181 B2
(45) Date of Patent: Oct. 20, 2026

(54) SYSTEM AND METHOD FOR OPERATING OBJECT

(71) Applicants: HYUNDAI MOTOR COMPANY, Seoul (KR); Kia Corporation, Seoul (KR)

(72) Inventors: Dae Hyun Kim, Seoul (KR); Ig Yeong Jeong, Hwaseong-si (KR)

(73) Assignees: HYUNDAI MOTOR, Seoul (KR); KIA CORPORATION, Seoul (KR)

( * ) Notice: Subject to any disclaimer, the term of this patent is extended or adjusted under 35 U.S.C. 154(b) by 212 days.

(21) Appl. No.: 18/228,053

(22) Filed: Jul. 31, 2023

(65) Prior Publication Data

US 2024/0132111 A1 Apr. 25, 2024
US 2024/0227863 A9 Jul. 11, 2024

(30) Foreign Application Priority Data

Oct. 21, 2022 (KR) ........................ 10-2022-0136621

(51) Int. Cl.
*B60W 60/00* (2020.01)
*G06Q 10/083* (2023.01)

(52) U.S. Cl.
CPC ... *B60W 60/00256* (2020.02); *B60W 2555/20* (2020.02); *B60W 2556/45* (2020.02); *G06Q 10/083* (2013.01)

(58) Field of Classification Search
None
See application file for complete search history.

(56) References Cited

U.S. PATENT DOCUMENTS

| | | | | |
|---|---|---|---|---|
| 9,230,236 B2 * | 1/2016 | Villamar | ................ | G06Q 10/08 |
| 10,545,509 B1 * | 1/2020 | Jessen | .................. | B62D 31/003 |
| 11,125,573 B2 * | 9/2021 | Matsuoka | .......... | G01C 21/3407 |
| 11,242,033 B2 * | 2/2022 | Sakurada | ................ | B60R 25/01 |
| 2015/0356665 A1 * | 12/2015 | Colson | .............. | G06Q 30/0635 705/26.81 |
| 2018/0246513 A1 * | 8/2018 | Cronin | .................... | G07F 9/001 |
| 2019/0034857 A1 * | 1/2019 | Ferguson | ........... | G07C 9/00896 |
| 2019/0049995 A1 * | 2/2019 | Ferguson | ........... | G06Q 10/0837 |
| 2019/0073631 A1 * | 3/2019 | Ferguson | ............. | G05D 1/6445 |
| 2019/0205966 A1 * | 7/2019 | Igata | ....................... | H04W 4/35 |
| 2019/0227551 A1 * | 7/2019 | Igata | ...................... | G06Q 20/20 |
| 2020/0234594 A1 * | 7/2020 | Dogishi | ............... | G05D 1/0088 |

* cited by examiner

*Primary Examiner* — Justin S Lee
(74) *Attorney, Agent, or Firm* — Morgan, Lewis & Bockius LLP

(57) ABSTRACT

A system for operating an object includes at least one autonomous driving platform to perform autonomous driving, at least one object loaded onto an upper portion of the at least one autonomous driving platform, unloaded from the upper portion of the at least one autonomous driving platform, and including a product, and a server to select an object of the at least one object to provide a product, which is to be sold to a user, based on product purchase information for a specific area, and to select an autonomous driving platform, which performs the autonomous driving in the specific area, of the at least autonomous driving platform, based on information on the specific area and the selected object.

20 Claims, 8 Drawing Sheets

SYSTEM AND METHOD FOR OPERATING OBJECT

CROSS-REFERENCE TO RELATED APPLICATION

The present application claims priority to Korean Patent Application No. 10-2022-0136621, filed on Oct. 21, 2022, the entire contents of which is incorporated herein for all purposes by this reference.

BACKGROUND OF THE PRESENT DISCLOSURE

Field of the Present Disclosure

The present disclosure relates to a system and a method for operating an object.

Description of Related Art

Recently, an unmanned store has been formed and a robomart has been developed to deliver a product to a user. The robomart is implemented with an autonomous driving vehicle to deliver a product to the position of a user, when the user orders products, such as groceries through a mobile unmanned supermarket. Furthermore, to safely and freshly store a product desired by the user, and to deliver the product to the position of the user, various devices depending to the type of products need to be integrally provided in the autonomous driving vehicle, and the required various devices may be varied depending the products desired by the user. For example, to deliver the processed foods, a shelf needs to be provided inside the autonomous driving vehicle to arrange the processed foods inside the autonomous driving vehicle. Furthermore, to deliver foods difficult to store in a frozen state, a refrigerating device is required inside the autonomous driving vehicle.

Accordingly, the autonomous driving is manufactured in various forms depending to the type of the products required by the user. This cause the manufacturing costs of the robomart.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and a method for operating an object, configured for selecting the object, which is to provide a product desired by a user, and an autonomous driving platform, which is to move the object to a destination, based on local information.

The technical problems to be solved by the present disclosure are not limited to the aforementioned problems, and any other technical problems not mentioned herein will be clearly understood from the following description by those skilled in the art to which the present disclosure pertains.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for operating an object, may include at least one autonomous driving platform to perform autonomous driving, at least one object loaded onto an upper portion of the at least one autonomous driving platform, unloaded from the upper portion of the at least one autonomous driving platform, and equipping a product and a server to select an object of the at least one object to provide a product, which is to be sold to a user, based on product purchase information for a predetermined area, and to select an autonomous driving platform, which performs the autonomous driving in the predetermined area, of the at least autonomous driving platform, based on information on the predetermined area and the selected object.

The server may obtain and learn the product purchase information, and select the at least one object, based on a result of the learning and weather information.

The server may transmit information on a destination for selling the product and information on the selected autonomous driving platform, to the selected object.

The server may transmit information on a position of the selected object to the selected autonomous driving platform.

The selected object may transmit a connection request message to the selected autonomous driving platform, when receiving the information on the selected autonomous driving platform from the server.

The selected autonomous driving platform may transmit, to the selected object, a request for an authentication for connection to the selected object, when receiving the connection request message.

The selected object may be loaded onto the upper portion of the selected autonomous driving platform, when the authentication is completed.

The selected object may be configured to generate a path to the destination, when loaded onto the upper portion of the selected autonomous driving platform, and transmits, to the selected autonomous driving platform, a moving command based on the path.

The selected object may provide, to the user, inventory information and information on a position of the selected object The selected object receives information on a position of the user, and may generate a moving path to the position of the user, and transmit a moving command based on the moving path, to the selected autonomous driving platform, when receiving a calling signal from the user.

According to an aspect of the present disclosure, a method for operating an object, may include selecting an object of at least one object, which is loaded onto an upper portion of at least one autonomous driving platform, and unloaded from the upper portion of the autonomous driving platform, and equips a product, to provide a product, which is to be sold to a user, based on product purchase information for a predetermined area, selecting an autonomous driving platform, which is to perform autonomous driving in the predetermined area, of at least one autonomous driving platform based on information on the predetermined area and the selected object, and controlling to perform the autonomous driving, when the selected object and the selected autonomous driving platform is connected to each other.

The selecting of the object may include obtaining and learning the product purchase information, and selecting the object, based on a result of the learning and weather information.

The method may further include transmitting information on a destination for selling the product and information on the selected autonomous driving platform, to the selected object.

The method may further include transmitting information on a position of the selected object to the selected autonomous driving platform.

The method may further include transmitting, by the selected object, a connection request message to the selected autonomous driving platform, when receiving the information on the selected autonomous driving platform.

The method may further include transmitting, by the selected autonomous driving platform, to the selected object, a request for an authentication for connection to the selected object, when receiving the connection request message.

The selected object may be loaded onto the upper portion of the selected autonomous driving platform, when the authentication is completed.

The method may further include generating, by the selected object, a path to the destination, when the selected object is loaded onto the upper portion of the selected autonomous driving platform and transmitting, to the selected autonomous driving platform, a moving command based on the path.

The selected object may provide, to the user, inventory information and information on a position of the selected object.

The selected object may receive information on a position of the user, generate a moving path to the position of the user, and transmit a moving command based on the moving path, to the selected autonomous driving platform, when receiving a calling signal from the user.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
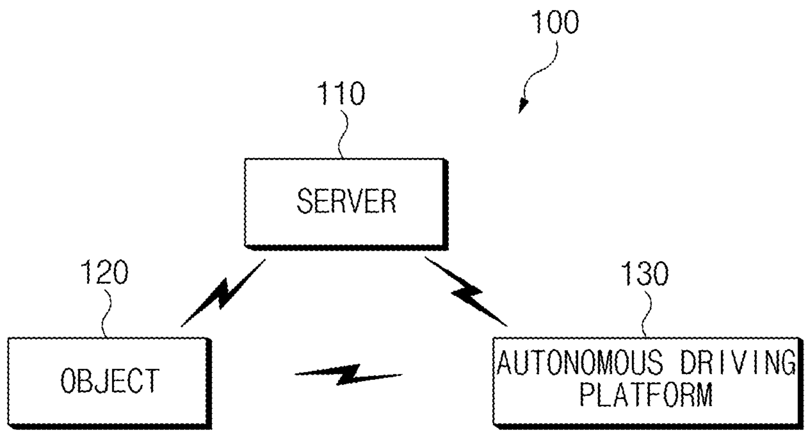
FIG. 1 is a view exemplarily illustrating the configuration of a system for operating the object, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

Furthermore, in the following description of components according to an exemplary embodiment of the present disclosure, the terms "first", "second", 'A', 13', '(a)', and '(13)' may be used. These terms are merely intended to distinguish one component from another component, and the terms do not limit the nature, sequence or order of the constituent components. Furthermore, unless otherwise defined, all terms used herein, including technical or scientific terms, include a same meanings as those generally understood by those skilled in the art to which the present disclosure pertains. Such terms as those defined in a generally used dictionary are to be interpreted as including meanings equal to the contextual meanings in the relevant field of art, and are not to be interpreted as including ideal or excessively formal meanings unless clearly defined as including such in the present application.

FIG. 1 is a view exemplarily illustrating the configuration of a system for operating the object, according to an exemplary embodiment of the present disclosure.

As illustrated in FIG. 1, a system 100 for operating the object may include a server 110, an object 120, and an autonomous driving platform 130.

The server 110 may select an object of the at least one object to provide a product, which is to be sold to a user, based on product purchase information for an area, and configured to select an autonomous driving platform, which autonomously drives in the specific area, of the at least autonomous driving platform, based on information on the area and the selected object. The details thereof will be described below with reference to FIG. 2.

The object 120 may be loaded at an upper portion of the autonomous driving platform 130, and unloaded from an upper portion of the autonomous driving platform 130. The object 120 may include an autonomous mart including the form loaded onto the upper portion of the autonomous driving platform 130, and may include a specific space including the form of an unmanned store to load products for sale to users. According to an exemplary embodiment of the present disclosure, the object 120 may include at least one object depending on the types of products to be provided to the users. For example, the object 120 may be stored in a large-scale warehouse (logistics storage). The object 120 may include an object including processed food (processed food autonomous mart), an object including drinks (drink autonomous mart), an object including fresh food (fresh food autonomous mart), an object including frozen food (frozen food autonomous mart), and an object including coffee (coffee autonomous mart). The details thereof will be described below with reference to FIG. 3.

The autonomous driving platform 130 may include mobility to autonomously drive. For example, the autonomous driving platform may include an autonomous vehicle including an autonomous driving truck, or an autonomous driving bus. According to an exemplary embodiment of the present disclosure, the autonomous driving platform 130 may include a mobility that moves by two or more wheels, and may be implemented in a form in which the object 120 may be loaded onto the upper portion thereof. At least one autonomous driving platform 130 may be present depending on a battery capacity, movable speed, weight, or driving performance, and may be stored in a large-scale warehouse (logistics storage). The place for storing the autonomous driving platform 130 may be a place the same as or different from the place for storing the object 120. The details thereof will be described below with reference to FIG. 4.

Figure 2:
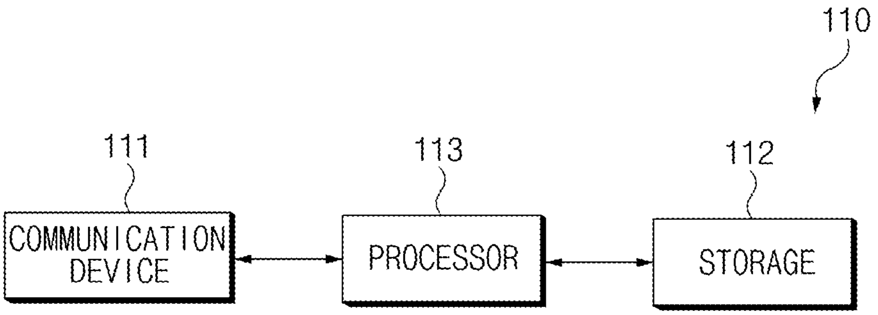
FIG. 2 is a view exemplarily illustrating the configuration of a server, according to an exemplary embodiment of the present disclosure.

FIG. 2 is a view exemplarily illustrating the configuration of a server, according to an exemplary embodiment of the present disclosure.

As illustrated in FIG. 2, the server 110 may include a communication device 111, a storage 112, and a processor 113.

The communication device 111 may make wireless communication with the object 120 and the autonomous driving platform 130. For example, the communication device 111 may make wireless communication with the object 120 and the autonomous driving platform 130 through various wireless communication schemes including Global System for Mobile communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LET). In addition, the communication device 111 may receive product purchase information on products to be sold in a specific area, from a purchase server, and may receive weather information in the specific area, from a weather server.

The storage 112 may store at least one algorithm to execute the computation of various instructions for the operation of the server according to an exemplary embodiment of the present disclosure. Furthermore, the storage 112 may store the product purchase information, which is received from the purchase server, depending on time zones. The storage 112 may include at least one storage medium of at least one a flash memory, a hard disc, a memory card, a Read Only Memory (ROM), a Random Access Memory (RAM), an Electrically Erasable and Programmable ROM (EEPROM), a Programmable ROM(PROM), a magnetic memory, a magnetic disc, or an optical disc.

The processor 113 may be implemented by various processing devices, such as a microprocessor embedded therein with a semiconductor chip to operate or execute various instructions, and may control the operation of the server according to an exemplary embodiment of the present disclosure. The processor 113 may be electrically connected to the communication device 111 or the storage 112 through a cable or various circuits to transmit an electrical signal including a control command and may transmit or receive the electrical signal including the control command through various wireless communication network, such as a control area network (CAN).

The processor 113 may learn product purchase information for each time slot in the specific area. Furthermore, the processor 113 may select an object, based on information on a product and a weather indicating the highest sales based on a learning result.

For example, the processor 113 may be configured to determine an object to be moved to area A, as a coffee object (hereinafter, referred to as a 'coffee object' for convenience), when area A is a commercial area, and the product including the highest sales is coffee, and when the temperature is high. Furthermore, the processor 113 may be configured to determine an object to be moved to area B, as an object including fresh foods (hereinafter, referred to as a 'fresh food object' for convenience), when area B is a residential area, and a product including the highest sales is fresh food, and when it rains. Furthermore, the processor 113 may be configured to determine an object to be moved to area C as an object (hereinafter, referred to as a 'processed food object' for convenience) including processed food, when area C is a park, and a product including the highest sales is processed food, and when it's sunny.

The processor 113 may select an autonomous driving platform, based on information (slope, a curved road, or a straight road) of a road in the specific area, and the information on the selected object.

For example, the processor 113 may select an autonomous driving platform for loading the coffee object, based on whether to autonomously drive on a wider road (a road having a large turning radius), on a drivable speed, on a battery remaining capacity, on the electricity usage of the coffee object, on the weight of the coffee object, on a software platform type of the coffee object, on the version of the coffee object, and on the compatibility of the coffee object, when area A is a commercial area, and when the coffee object is selected.

For example, the processor 113 may select an autonomous driving platform for loading the fresh food object, based on whether to autonomously drive on a narrower road (a road having a small turning radius), on a drivable speed, on a battery remaining capacity, on the electricity usage of the fresh food object, on the weight of the fresh food object, on a software platform type of the fresh food object, on the version of the fresh food object, and on the compatibility of the fresh food object, when area B is a residential area, and when the fresh food object is selected.

For example, the processor 113 may select an autonomous driving platform for loading the processed food object, based on whether to autonomously drive on a narrower road (a road having a small turning radius), on a drivable speed, on a battery remaining capacity, on the electricity usage of the processed food object, on the weight of the processed food object, on a software platform type of the processed food object, on the version of the processed food object, and on the compatibility of the processed food object, when area C is a park, and when the processed food object is selected.

The details thereof will be described below with reference to FIG. 3 and FIG. 4.

Figure 3:
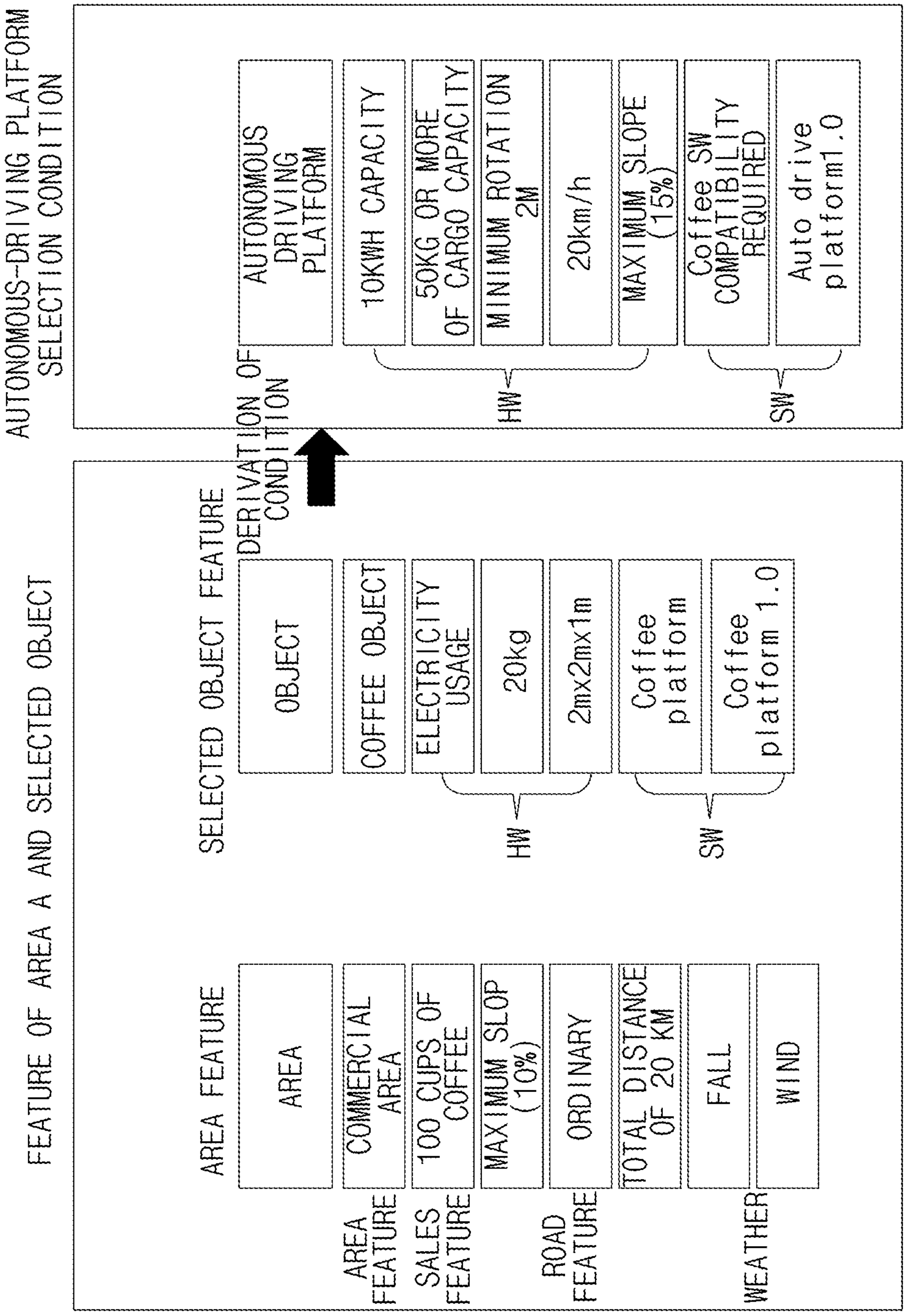
FIG. 3 and FIG. 4 are views schematically illustrating an operation of selecting an object and an autonomous driving platform, according to an exemplary embodiment of the present disclosure.
Figure 4:
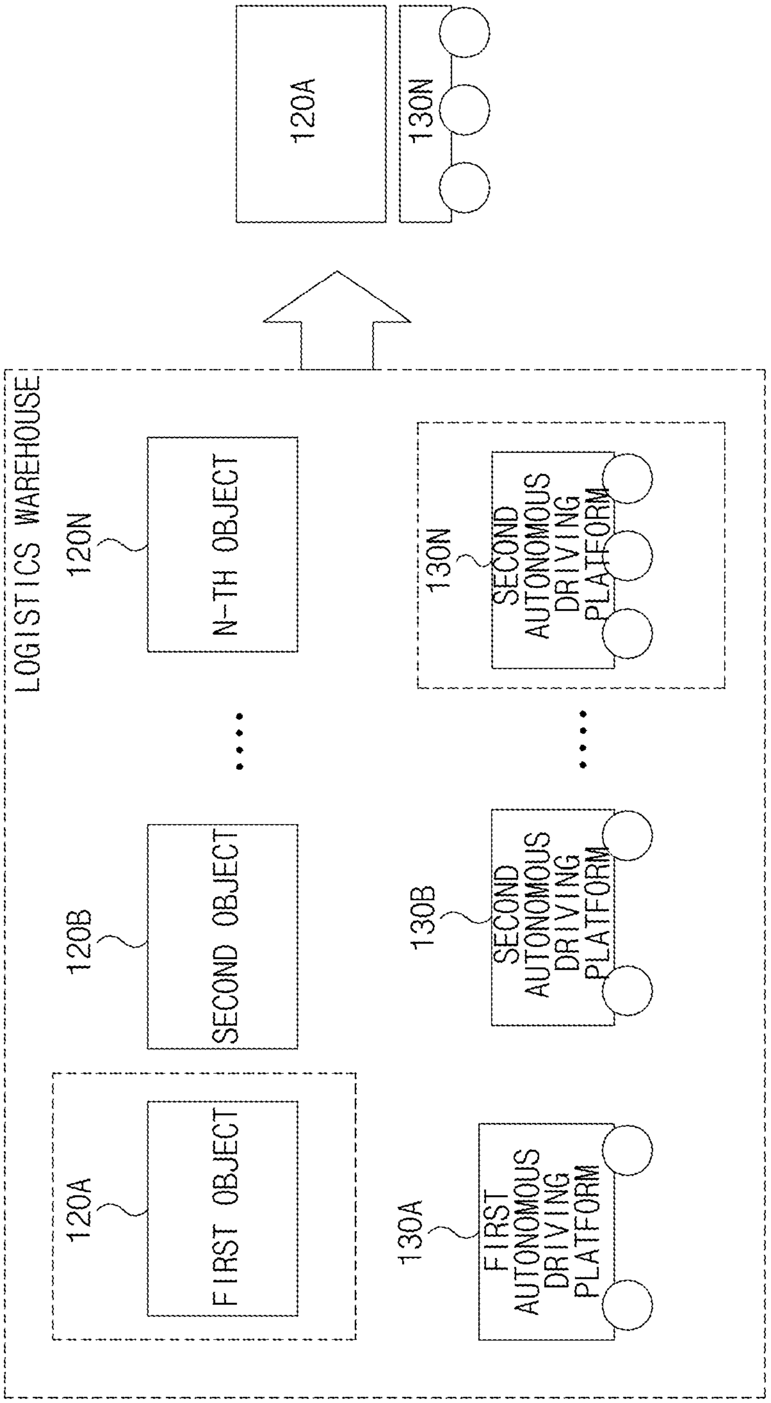

FIG. 3 and FIG. 4 are views schematically illustrating an operation of selecting an object and an autonomous driving platform 130, according to an exemplary embodiment of the present disclosure.

As illustrated in FIG. 3, the processor 113 may derive a condition for selecting the autonomous driving platform, based on the feature (an electricity usage, a weight, a size, and the type and the version of a software platform used) of the coffee object, when an object based on the feature of a specific area (e.g., area A) is the coffee object, As illustrated in FIG. 4, the processor 113 may select a first object 120A from at least one object (a first object 120A, a second object 120B, . . . , and an N-th object 120N) stored in the logistics storage, based on product purchase information and weather information for a specific area, when moving an object to the specific area (area A), and may select an N-th autonomous driving platform 130N, from among at least one autonomous driving platform (a first autonomous driving platform 130A, a second autonomous driving platform 130B, . . . , and an N-th autonomous driving platform 130N) stored in a logistics storage, based on road information (slope, a curved road, or a straight road) in the specific area and information on the selected object.

The processor 113 may transmit destination information and information of the selected autonomous driving platform to the selected object. In the instant case, the destination may refer to a point at which a product is provided to a user, that is, one point in a specific area to which the object moves. Furthermore, the processor 113 may transmit the information on the position of the selected object to the selected autonomous driving platform.

Figure 5:
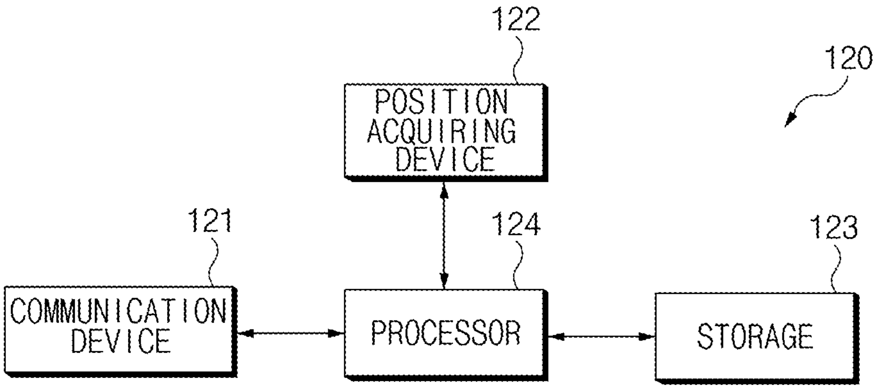
FIG. 5 is a view exemplarily illustrating the configuration of an object, according to an exemplary embodiment of the present disclosure.

FIG. 5 is a view exemplarily illustrating the configuration of an object, according to an exemplary embodiment of the present disclosure.

As illustrated in FIG. 5, the object 120 may include a communication device 121, a storage 123, and a processor 124. Although not illustrated, the object 120 may include the form easily loaded onto the upper portion of the autonomous driving platform, easily storing a product, and easily providing the product to the user. Accordingly, the object 120 may include at least one receiving structure, and an openable door.

The communication device 121 may make wireless communication with the server 110 and the autonomous driving platform 130. For example, the communication device 121 may make wireless communication with the server 110 and the autonomous driving platform 130 through various wireless communication schemes including Global System for Mobile communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LET). Furthermore, the communication device 121 may make wireless communication with the terminal (a mobile phone, tablet PC, a laptop computer, or a vehicle terminal) of a user, and transmit inventory information of the product and information on the position of the object 120 to the terminal of the user.

The position acquiring device 122 may include a global positioning system (GPS) receiver to obtain information on the position of the object, map the position of the object to map data, which is previously stored, and may provide a path from a present position to a destination which is received from the server 110.

The storage 123 may store at least one algorithm to execute the computation of various instructions for the operation of the object according to an exemplary embodiment of the present disclosure. The storage 123 may include at least one storage medium of at least one a flash memory, a hard disc, a memory card, a Read Only Memory (ROM), a Random Access Memory (RAM), an Electrically Erasable and Programmable ROM (EEPROM), a Programmable ROM(PROM), a magnetic memory, a magnetic disc, or an optical disc.

The processor 124 may be implemented by various processing devices, such as a microprocessor embedded therein with a semiconductor chip to operate or execute various instructions, and may control the operation of the object according to an exemplary embodiment of the present disclosure. The processor 124 may be electrically connected to the communication device 111, the position acquiring device 122, or the storage 123 through a cable or various circuits to transmit an electrical signal including a control command and may transmit or receive the electrical signal including the control command through various wireless communication network, such as a control area network (CAN).

The processor 124 may transmit a request for a connection (to load the object onto the upper portion of the selected autonomous driving platform) to the selected autonomous driving platform, when receiving the information on the destination and the information on the selected autonomous driving platform from the server. The processor 124 may load the object 120 onto the upper portion of the selected autonomous driving platform 130, when the request for authentication from the selected autonomous driving platform 130 is received, and the authentication is completed. The object 120 may be loaded onto the upper portion of the selected autonomous driving platform in various manners. For example, when at least one object is positioned on a shelf including a conveyer belt, and when the selected autonomous driving platform is moved to the position of the selected position, the selected object may be loaded onto the upper portion of the autonomous driving platform depending on the conveyer belt.

When the object 120 is loaded on the selected autonomous driving platform, the processor 124 may be configured to generate a path to the destination. Furthermore, the processor 124 may transmit a moving command (autonomous driving control command) based on a path to the destination, to the selected autonomous driving platform.

When receiving a calling signal from the user while moving to the destination, the processor 124 may receive the information on the position of the user, generate a moving path to the position of the user, and transmit the moving command based on the movement path to the selected autonomous driving platform.

Figure 6:
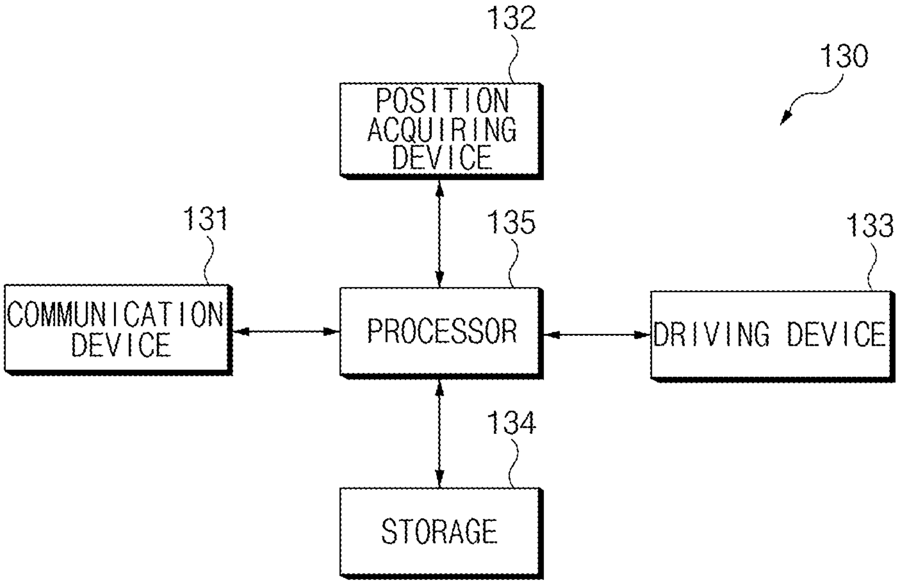
FIG. 6 is a view exemplarily illustrating the configuration of an autonomous driving platform, according to an exemplary embodiment of the present disclosure.

FIG. 6 is a view exemplarily illustrating the configuration of an autonomous driving platform, according to an exemplary embodiment of the present disclosure.

As illustrated in FIG. 6, the autonomous driving platform 130 may include a communication device 131, a position acquiring device 132, a driving device 133, a storage 134, and a processor 135.

The communication device 131 may make wireless communication with the server 110 and the object 120. For example, the communication device 131 may make wireless communication with the server 110 and the object 120 through various wireless communication schemes including Global System for Mobile communication (GSM), Code Division Multiple Access (CDMA), Wideband Code Division Multiple Access (WCDMA), Universal Mobile Telecommunication System (UMTS), Time Division Multiple Access (TDMA), and Long Term Evolution (LET).

The position acquiring device 132 may include a global positioning system (GPS) receiver to obtain information on the position of the autonomous driving platform, may map the position of the autonomous driving platform to map data, which is previously stored, and may provide a path from a present position to a destination which is received from the server 110.

The driving device 133 may control the movement of the autonomous driving platform, based on the command of the processor 135, which corresponds to the moving command received from the object 120. For example, the driving device 133 may include a motor driver, a steering driver, a brake driver, a lamp driver, or a suspension driver.

The storage 134 may store at least one algorithm to execute the computation of various instructions for the operation of the autonomous driving platform according to an exemplary embodiment of the present disclosure. The storage 134 may include at least one storage medium of at least one a flash memory, a hard disc, a memory card, a Read Only Memory (ROM), a Random Access Memory (RAM), an Electrically Erasable and Programmable ROM (EEPROM), a Programmable ROM(PROM), a magnetic memory, a magnetic disc, or an optical disc.

The processor 135 may be implemented by various processing devices, such as a microprocessor embedded therein with a semiconductor chip to operate or execute various instructions, and may control the operation of the autonomous driving platform according to an exemplary embodiment of the present disclosure. The processor 135 may be electrically connected to the communication device 131, the position acquiring device 132, the driving device 133, or the storage 134 through a cable or various circuits to transmit an electrical signal including a control command and may transmit or receive the electrical signal including the control command through various wireless communication network, such as a control area network (CAN).

The processor 135 may transmit a request for authentication to the object, when receiving information on the position of the object from the server 110 and receiving a request for connection from the object. The processor 135 may perform an operation of loading the object, when the authentication is completed together with the object. In the instant case, the object may be loaded in various manners. For example, the processor 135 may control the movement to the position of the object transmitting the request for the connection.

The processor 135 may control the driving device 133 to perform the autonomous driving along the path, when receiving the moving command based on the path to the destination from the object.

Furthermore, the processor 135 may control the driving device 133 to perform the autonomous driving along the path, when receiving the moving command based on the path to the position of the user from the object.

Figure 7:
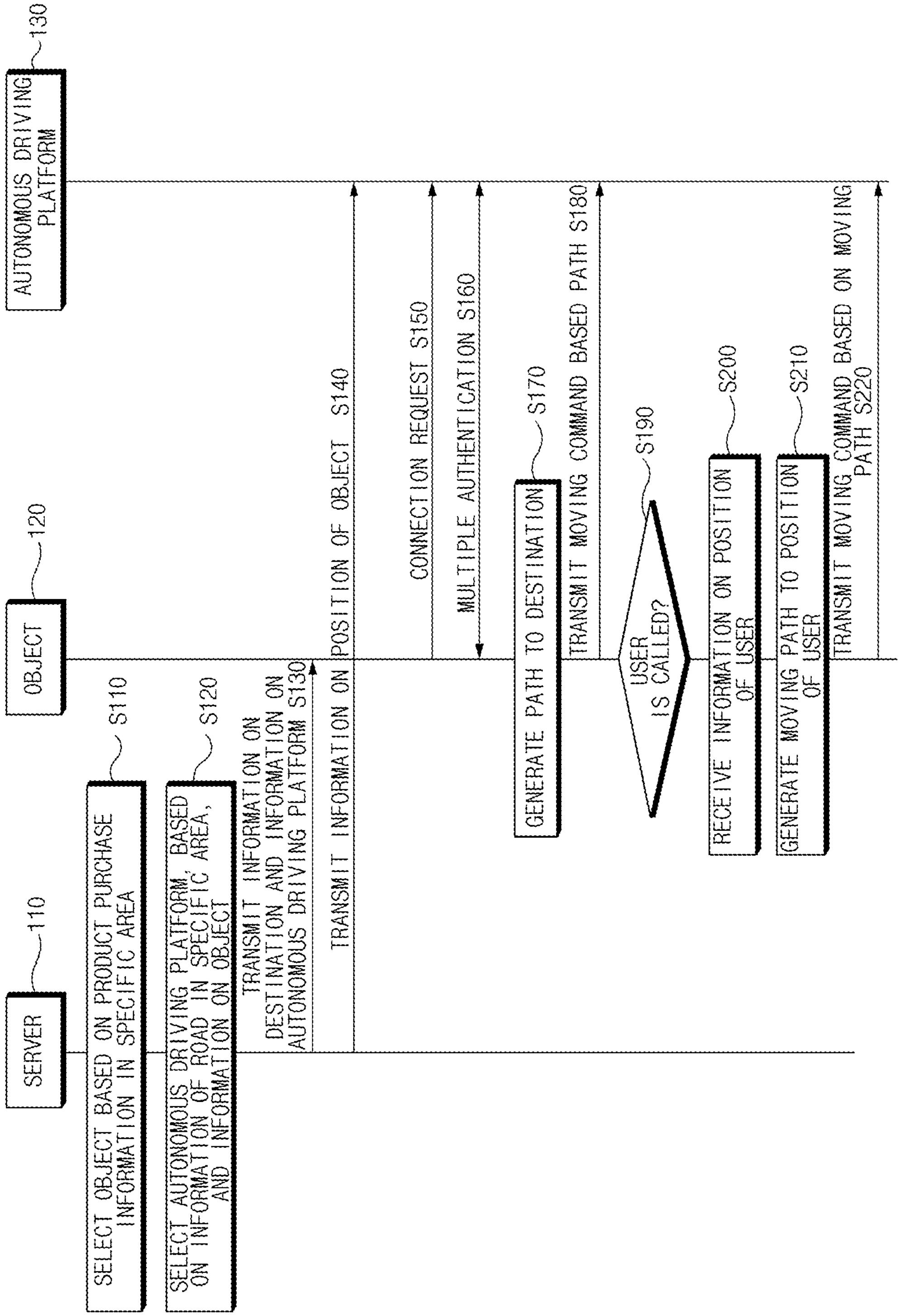
FIG. 7 is a view exemplarily illustrating a method for operating an object, according to an exemplary embodiment of the present disclosure.

FIG. 7 is a view exemplarily illustrating a method for operating the object, according to an exemplary embodiment of the present disclosure.

As illustrated in FIG. 7, the server 110 may select an object based on product purchase information in a specific area (S110). In S110, the server 110 may learn the product purchase information for each time slot in the specific area, and may select an object based on information on a product including the highest sales and information on a weather indicating the highest sales, depending on the learning result.

The server 110 may select an autonomous driving platform, based on information (slope, a curved road, or a straight road) of a road in the specific area, and the information on the selected object (S120).

The server 110 may select information on the autonomous driving platform, based on the information on the selected object and road information, when the object is selected (S120).

The server 110 may transmit information on the destination and the information on the selected autonomous driving platform 130 to the selected object 120 (S130). Furthermore, the server 110 may transmit the information on the position of the selected object to the selected autonomous driving platform 130 (S140).

When receiving the information on the selected autonomous driving platform, the selected object 120 may transmit the request for connection to the selected autonomous driving platform (S150).

When receiving the connection request from the selected object, the selected autonomous driving platform 130 may transmit the request for authentication to the selected object. Furthermore, the selected object 120 may receive the request for the authentication from the selected autonomous driving platform 130 and perform the authentication together with the selected autonomous driving platform 130 (S160). When the authentication is completed in S160, the selected object 120 may be loaded onto the upper portion the selected autonomous driving platform.

When the authentication is completed, the selected object 120 may be configured to generate a path to the destination (S170). Furthermore, the selected object 120 may transmit a moving command based on the path to the selected autonomous driving platform 130 (S180). After S180, the selected autonomous driving platform 130 may control the driving device 133, based on the moving command based on the path of the destination, which is received from the object, to perform the autonomous driving along the path.

The selected object 120 may be configured to determine whether a calling signal has been received from a user while moving to the destination (S190). When receiving the calling signal from the user in S190, the selected object 120 may receive information on the position of the user (S200). Furthermore, the selected object 120 may be configured to generate the moving path to the position of the user (S210). The selected object 120 may transmit a moving command based on the path to the selected autonomous driving platform (S220). The selected autonomous driving platform 130 may control the driving device 133 based on the moving command based on the path to the position of the user, which is received from the object, to perform the autonomous driving along the path, after S220.

Figure 8:
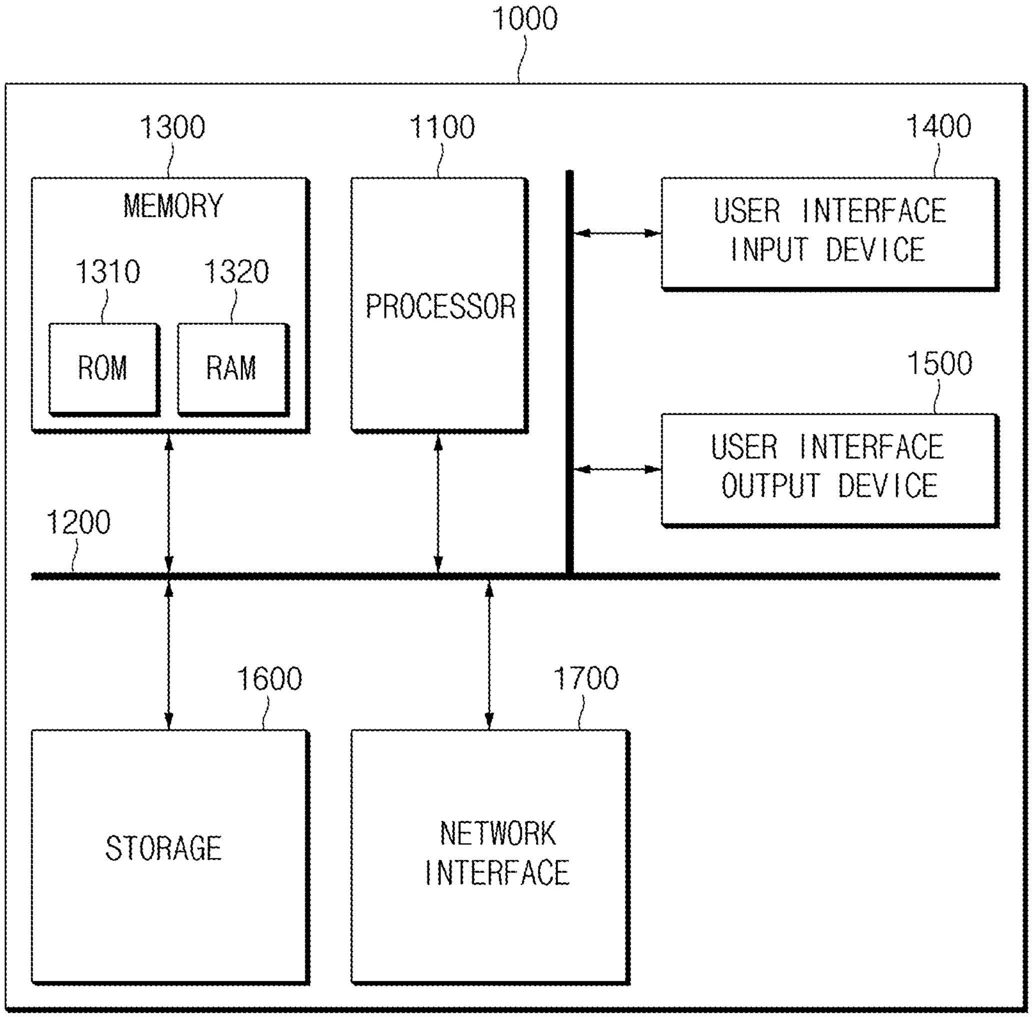
FIG. 8 is a view exemplarily illustrating a computing system to perform the method, according to an exemplary embodiment of the present disclosure.

FIG. 8 is a block diagram illustrating a computing system to execute the method according to various exemplary embodiments of the present disclosure.

Referring to FIG. 8, a computing system 1000 may include at least one processor 1100, a memory 1300, a user interface input device 1400, a user interface output device 1500, a storage 1600, and a network interface 1700, which are connected to each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the exemplary embodiments included in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an exemplary embodiment of the present disclosure, in the system and the method for operating the object, the object, which is to provide a product desired by the user, and the autonomous driving platform, which is to move the object, are selected based on local information. Furthermore, the selected object and the selected autonomous driving platform are connected to each other for the movement to the destination. Accordingly, the manufacturing costs may be reduced, and the satisfaction of the user may be improved.

The above description is merely an example of the technical idea of the present disclosure, and various modifications and modifications may be made by one skilled in the art without departing from the essential characteristic of the present disclosure.

Accordingly, various embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for operating an object, the system comprising:

a plurality of autonomous driving platforms configured to perform autonomous driving;

a plurality of objects configured to be loaded onto an upper portion of one of the plurality of autonomous driving platforms, unloaded from the upper portion of the one of the plurality of autonomous driving platforms, and equip a product; and a server configured to select one of the plurality of objects to provide the product, which is to be sold to a user, based on product purchase information for a predetermined area, and select one of the plurality of autonomous driving platforms, which performs the autonomous driving in the predetermined area, based on the product purchase information on the predetermined area and the selected object.

2. The system of claim 1, wherein the server is further configured to:

obtain and learn the product purchase information, and select at least one object, based on a result of the learning and a weather information.

3. The system of claim 1, wherein the server is further configured to:

transmit information on a destination for selling the product and information on the selected autonomous driving platform, to the selected object.

4. The system of claim 1, wherein the server is further configured to:

transmit information on a position of the selected object to the selected autonomous driving platform.

5. The system of claim 3, wherein the selected object is configured to:

transmit a connection request message to the selected autonomous driving platform, when receiving the information on the selected autonomous driving platform from the server.

6. The system of claim 5, wherein the selected autonomous driving platform is configured to:

transmit to the selected object, a request for an authentication for connection to the selected object, when receiving the connection request message.

7. The system of claim 6, wherein the selected object is configured to:

load onto the upper portion of the selected autonomous driving platform, when the authentication is completed.

8. The system of claim 3, wherein the selected object is further configured to:

generate a path to the destination, when loaded onto the upper portion of the selected autonomous driving platform, and transmit, to the selected autonomous driving platform, a moving command based on the path.

9. The system of claim 1, wherein the selected object is configured to:

provide to the user, inventory information and information on a position of the selected object.

10. The system of claim 1, wherein the selected object is configured to:

receive information on a position of the user, generate a moving path to the position of the user, and transmit a moving command based on the moving path, to the selected autonomous driving platform, when receiving a calling signal from the user.

11. A method for operating an object, the method comprising:

selecting one of a plurality of objects, which is loaded onto an upper portion of one of a plurality of autonomous driving platforms, and unloaded from the upper portion of the one of the plurality of the autonomous driving platforms, and includes a product, to provide the product, which is to be sold to a user, based on product purchase information for a predetermined area;

selecting one of the plurality of autonomous driving platforms to perform autonomous driving in the predetermined area, based on the product purchase information on the predetermined area and the selected object; and controlling to perform the autonomous driving, when the selected object and the selected autonomous driving platform is connected to each other.

12. The method of claim 11, wherein the selecting of the object includes:

obtaining and learning the product purchase information, and selecting the object, based on a result of the learning and a weather information.

13. The method of claim 11, further including:

transmitting information on a destination for selling the product and information on the selected autonomous driving platform, to the selected object.

14. The method of claim 11, further including:

transmitting information on a position of the selected object to the selected autonomous driving platform.

15. The method of claim 13, further including:

transmitting, by the selected object, a connection request message to the selected autonomous driving platform, when receiving the information on the selected autonomous driving platform.

16. The method of claim 15, further including:

transmitting, by the selected autonomous driving platform, to the selected object, a request for an authentication for connection to the selected object, when receiving the connection request message.

17. The method of claim 16, wherein the selected object is loaded onto the upper portion of the selected autonomous driving platform, when the authentication is completed.

18. The method of claim 13, further including:

generating, by the selected object, a path to the destination, when the selected object is loaded onto the upper portion of the selected autonomous driving platform; and transmitting, to the selected autonomous driving platform, a moving command based on the path.

19. The method of claim 11, wherein the selected object is configured to provide, to the user, inventory information and information on a position of the selected object.

20. The method of claim 11, wherein the selected object is configured to receive information on a position of the user, generate a moving path to the position of the user, and transmit a moving command based on the moving path, to the selected autonomous driving platform, when receiving a calling signal from the user.

* * * * *